United States Patent
Sorenson et al.

(10) Patent No.: US 11,444,447 B2
(45) Date of Patent: Sep. 13, 2022

(54) GROUND FAULT CIRCUIT BREAKER WITH REMOTE TESTING CAPABILITY

(71) Applicant: Carling Technologies, Inc., Plainville, CT (US)

(72) Inventors: Richard W. Sorenson, Ft. Lauderdale, FL (US); Michael Fasano, Watertown, CT (US); Simon Cordner, Voorhees, NJ (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 17/078,776

(22) Filed: Oct. 23, 2020

(65) Prior Publication Data

US 2021/0159690 A1 May 27, 2021

Related U.S. Application Data

(60) Provisional application No. 62/940,666, filed on Nov. 26, 2019.

(51) Int. Cl.
*H02H 3/16* (2006.01)
*H01H 71/02* (2006.01)
(Continued)

(52) U.S. Cl.
CPC .............. *H02H 3/16* (2013.01); *H01H 71/02* (2013.01); *H01H 71/08* (2013.01);
(Continued)

(58) Field of Classification Search
CPC .......... H02H 3/16; H02H 7/02; H02H 1/0007; H02H 1/0092; H02H 1/061; H02H 3/044;
(Continued)

(56) References Cited

U.S. PATENT DOCUMENTS

| 4,288,768 A | 9/1981 | Arnhold et al. |
| 9,659,721 B1 | 5/2017 | Sastry et al. |

(Continued)

FOREIGN PATENT DOCUMENTS

| AU | 2019210625 | 3/2020 |
| EP | 0008026 | 2/1980 |

(Continued)

*Primary Examiner* — Kevin J Comber
(74) *Attorney, Agent, or Firm* — KDB Firm PLLC (57) ABSTRACT

A circuit interrupting device includes line and load terminals and an interrupter electrically coupled therebetween, the interrupter having open and closed conditions. The device also includes a fault detector configured to detect a fault in an electrical signal in the load circuit. When such a fault is detected, the fault detector causes actuation of the interrupter to the open condition. A communication interface is adapted to receive a remote test command signal, and a processor generates, in response to receipt of the remote test command signal, a simulated fault in the load circuit, such that the fault detector attempts to cause actuation of the interrupter to the open condition. The processor determines whether or not the fault detector successfully caused actuation of the interrupter to the open condition in response to receipt of the remote test command signal, and if not, generates an alarm signal indicative of a malfunction.

25 Claims, 5 Drawing Sheets

(51) Int. Cl.
*H01H 71/08* (2006.01)
*H02H 1/00* (2006.01)
*H04L 67/125* (2022.01)

(52) U.S. Cl.
CPC ........ *H02H 1/0007* (2013.01); *H02H 1/0092* (2013.01); *H04L 67/125* (2013.01)

(58) Field of Classification Search
CPC ........ H02H 3/335; H02H 3/046; H01H 71/02; H01H 71/08; H01H 1/007; H01H 1/0092; H01H 67/125; H01H 7/02; H01H 83/02; H01H 2083/201; H04L 67/125
USPC .......................................................... 361/42
See application file for complete search history.

(56) References Cited

U.S. PATENT DOCUMENTS 10,326,264 B1* 6/2019 Gass ................ G01R 31/3278
2008/0007879 A1 1/2008 Zaretsky et al.
2009/0212967 A1* 8/2009 Bonasia ................ H02H 3/335
 340/4.32
2013/0002262 A1 1/2013 Tago et al.
2017/0025892 A1* 1/2017 Van Ostrand ............ H02H 3/16
2018/0149700 A1 5/2018 Bernard
2019/0356127 A1 11/2019 Ostrovsky et al.
2020/0212959 A1* 7/2020 Eriksen .............. H01R 13/7135

FOREIGN PATENT DOCUMENTS

| | | |
|---|---|---|
| EP | 3327747 | 5/2018 |
| JP | 11345557 A | 12/1999 |
| JP | 2003178664 A | 6/2003 |
| JP | 2010044946 A | 2/2010 |
| JP | 2013013270 A | 1/2013 |
| JP | 2016092881 A | 5/2016 |
| WO | WO2007143576 | 12/2007 |

* cited by examiner

GROUND FAULT CIRCUIT BREAKER WITH REMOTE TESTING CAPABILITY

FIELD OF THE INVENTION

The present invention is generally directed to a circuit breaker device including ground fault circuit interrupter (GFCI) functionality, and more particularly, to such a GFCI circuit breaker device that allows for on and off control of the circuit breaker from a remote location using electronic control signals.

BACKGROUND OF THE INVENTION

A GFCI device is a device that is capable of switching between an operative (closed) condition and a tripped (open) condition based on the detection of selected criteria. Specifically, a GFCI device is designed to interrupt the supply of electric power when the device detects that current is traveling along an unintended ground path (e.g., through a person, or through water, etc.). GFCI devices may be included in any of numerous types of components that are capable of interrupting the supply of electric power, such as circuit breakers, electrical outlets, etc.

GFCI outlets have become widely used throughout the United States and are credited with saving many lives. Although the widespread use of GFCI devices for the past thirty-plus years has led to a large number of installations, these devices are susceptible to deterioration and eventual failure. Failure of the GFCI device can lead to the device providing electrical power like any normal outlet, even though the protective features that differentiate the GFCI device from conventional devices is no longer functional. This creates a dangerous situation where the GFCI device is still thought to be functional and providing life saving protection when, in fact, it is not.

Typical GFCI devices are provided with a testing feature on the face of the device. For example, on a typical GFCI outlet, there is a "test" button and a "reset" button. When a user pushes the test button, this simulates a ground fault problem such that the outlet should toggle to a tripped or open state to interrupt the supply of electrical power to the "load" terminals and to any device plugged into the outlet.

More and more building codes have been requiring that GFCI functionality (as well as arc fault protection) be implemented on the circuit breaker level rather than on the electrical outlet level. This ensures that the whole circuit is protected against ground faults, rather than only that portion of the circuit including and downstream from the GFCI outlet being protected. Thus, GFCI circuit breakers are known and are becoming more and more popular.

Additionally, in some applications, it is desirable to operate a circuit breaker remotely. For example, an operator may typically trip a circuit breaker manually to de-energize a protected circuit so that it can be inspected or serviced. However, in some circuits, operating the breaker can produce a dangerous arc, creating a safety hazard for the operator. In still other circuits, the circuit breaker may be located in a confined or hazardous environment, such as on a ship. In these situations, it is beneficial to manually operate the circuit breaker remotely.

In other applications, such as in large office buildings, it may be desirable, for example, to automatically trip circuits powering large banks of overhead lights, such that entire floors or sections of floors can be automatically shut down in response to timed signals at night without requiring that each individual light switch have a timer. In still other applications, again, such as on a ship, it may be desirable to trip circuit breakers remotely to turn on/off various devices, such as bilge pumps, without having to provide a separate switch in addition to the circuit breaker.

Known approaches to remotely controlling circuit breakers include incorporating a mechanism into the circuit breaker which can intentionally trip the circuit breaker mechanism and/or reset it. Examples of such mechanisms are solenoids or motors used to activate the trip mechanism, and solenoids or motors which are used to reset the circuit breaker by rearming the trip mechanism, such as by physically moving the switch handle using a solenoid or other motor or mechanism that can be remotely operated.

Similar to the GFCI outlets, CFCI circuit breakers are provided with a testing feature that simulates a ground fault problem such that the breaker should toggle to a tripped or open state to interrupt the supply of electrical power to the circuit. More specifically, in order to meet safety agency standards, such as Underwriters Laboratories (UL) within the United States, ground-fault circuit breakers are required to have a manual test button that is mandated to be actuated monthly to confirm functioning ground fault protection. The manual test button closes a simple circuit which places a small current within the ground fault electronics current transformer, resulting in an imbalance as would occur during a ground fault, with the breaker's monitoring electronics thereby recognizing a ground fault occurrence and sending current to the trip solenoid to trip the circuit breaker. In the case of GFCI circuit breakers, rather than a reset button being provided, the breaker may be reset using a handle or the like.

However, a problem exists, particularly in cases where remote control of circuit breakers is desirable, in that it may be relatively difficult and/or dangerous to routinely access the location of the circuit breaker, thereby making it more likely that routine (e.g., monthly) testing will be skipped. Such disincentivizing of testing may itself create hazards, as the GFCI circuit breaker may be thought to be functional and providing life saving protection when, in fact, it is not.

As such, there remains an unmet need in the industry for a GFCI circuit breaker design that facilitates GFCI testing, so as to provide an increased likelihood of compliance with a routine testing regime.

SUMMARY OF THE INVENTION

In accordance with a first aspect of the present invention, a circuit interrupting device includes a housing, a line terminal disposed on the housing, the line terminal adapted to be connected to a power source circuit to provide electrical power, a load terminal disposed on the housing, the load terminal adapted to be connected to a load circuit, and an interrupter disposed within the housing and electrically coupled between the line terminal and the load terminal, the interrupter having an open and a closed condition. The interrupter electrically connects the line terminal to the load terminal in the closed condition and electrically disconnects the line terminal from the load terminal in the open condition. The device also includes a fault detector configured to detect a fault in an electrical signal in the load circuit. When a fault is detected on the load circuit, the fault detector causes actuation of the interrupter to the open condition. A communication interface is adapted to receive a remote test command signal, and a processor generates, in response to receipt of the remote test command signal, a simulated fault in the load circuit, such that the fault detector attempts to cause actuation of the interrupter to the open condition. The processor determines whether or not the fault detector successfully caused actuation of the interrupter to the open condition in response to receipt of the remote test command signal, and if not, generates an alarm signal indicative of a malfunction.

In some embodiments, the circuit interrupting device further comprises a handle extending from the housing, the handle adapted to allow for the interrupter to be reset from the open condition to the closed condition.

In some embodiments, the circuit interrupting device further comprises a resetting mechanism, the resetting mechanism adapted to allow for the interrupter to be reset from the open condition to the closed condition upon receipt of a reset command signal. In certain of these embodiments, the reset command signal is received via the communication interface. In certain embodiments, the reset command signal is generated automatically by the processor if the processor determines that the fault detector successfully caused actuation of the interrupter to the open condition in response to receipt of the remote test command signal.

In some embodiments, the remote test command signal is automatically generated periodically. In certain of these embodiments, a period between instances of automatic generation of the remote test command is programmable by a user.

In some embodiments, the circuit interrupting device further comprises a storage device on which is stored records of dates and times of when past simulated fault tests were performed. In some embodiments, the alarm signal is transmitted via the communication interface. In some embodiments, the fault comprises at least one of a ground fault and an arc fault.

In some embodiments, the communication interface comprises a wired connection. In some embodiments, the communication interface comprises a wireless connection. In certain of these embodiments, the communication interface comprises at least one of a wireless local area network and Bluetooth. In some embodiments, the communication interface comprises a CAN Bus or a LIN Bus.

In some embodiments, the processor is adapted to receive a remote off command via the communication interface, and in response to the remote off command, generate a simulated fault in the load circuit, such that the fault detector causes actuation of the interrupter to the open condition, whereby one and the same interrupter is employed for both fault tripping and commanded tripping.

In some embodiments, the circuit interrupting device comprises a circuit breaker, wherein the interrupter comprises a pair of contacts movable with respect to each other between a closed position wherein the line terminal and the load terminal are in electrical communication with each other, and an open position wherein the line terminal and the load terminal are electrically isolated from each other, and the circuit interrupting further comprises a trip mechanism connected to at least one of the pair of contacts, the trip mechanism causing the pair of contacts to move from the closed position to the open position in response to an overcurrent, thereby tripping the circuit breaker.

In accordance with another aspect of the invention, a circuit breaker comprises a housing, a line terminal disposed on the housing, the line terminal adapted to be connected to a power source circuit to provide electrical power, a load terminal disposed on the housing, the load terminal adapted to be connected to a load circuit, a pair of contacts movable with respect to each other between a closed position wherein the line terminal and the load terminal are in electrical communication with each other, and an open position wherein the line terminal and the load terminal are electrically isolated from each other, and a trip mechanism connected to at least one of the pair of contacts, the trip mechanism causing the pair of contacts to move from the closed position to the open position in response to an overcurrent, thereby tripping the circuit breaker. A fault detector is configured to detect a fault in an electrical signal in the load circuit, wherein when a fault is detected on the load circuit, the fault detector causes actuation of the pair of contacts to the open condition. A communication interface is adapted to receive a remote test command signal that is automatically generated periodically, and a processor generates, in response to receipt of the remote test command signal, a simulated fault in the load circuit, such that the fault detector attempts to cause actuation of the pair of contacts to the open condition. The processor determines whether or not the fault detector successfully caused actuation of the pair of contacts to the open condition in response to receipt of the remote test command signal, and if not, generates an alarm signal indicative of a malfunction. A resetting mechanism is adapted to allow for the pair of contacts to be reset from the open condition to the closed condition upon receipt of a reset command signal via the communication interface, wherein the reset command signal is generated automatically by the processor if the processor determines that the fault detector successfully caused actuation of the pair of contacts to the open condition in response to receipt of the remote test command signal.

In some embodiments, a period between instances of automatic generation of the remote test command is programmable by a user. In some embodiments, the circuit breaker further comprises a storage device on which is stored records of dates and times of when past simulated fault tests were performed. In some embodiments, the alarm signal is transmitted via the communication interface.

In some embodiments, the circuit breaker further comprises a handle extending from the housing, the handle adapted to allow for the pair of contacts to be reset from the open condition to the closed condition. In some embodiments, the fault comprises at least one of a ground fault and an arc fault. In some embodiments, the communication interface comprises a wired connection.

In some embodiments, the communication interface comprises a wireless connection. In certain of these embodiments, the communication interface comprises at least one of a wireless local area network and Bluetooth. In some embodiments, the communication interface comprises a CAN Bus or a LIN Bus.

In some embodiments, the processor is adapted to receive a remote off command via the communication interface, and in response to the remote off command, generate a simulated fault in the load circuit, such that the fault detector causes actuation of the pair of contacts to the open condition, whereby one and the same pair of contacts is employed for both fault tripping and commanded tripping.

Other objects of the invention and its particular features and advantages will become more apparent from consideration of the following drawings and accompanying detailed description.

DETAILED DESCRIPTION OF THE INVENTION

Figure 1:
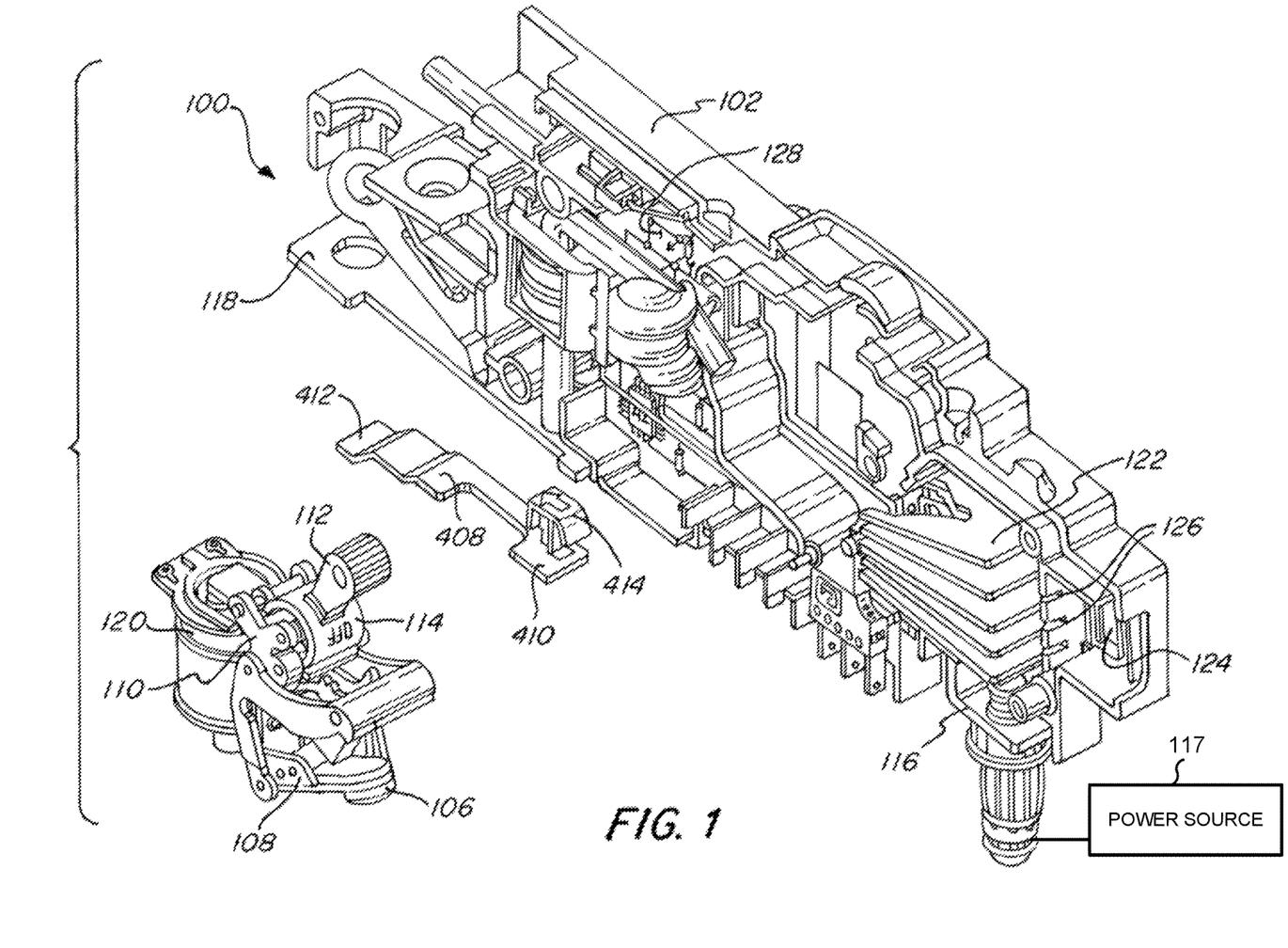
FIG. 1 is a partial exploded isometric view of a circuit breaker including ground fault circuit interrupter (GFCI) functionality according to an exemplary embodiment of the present invention.

Referring to the Figures in detail and first to FIG. 1, there is shown an exemplary embodiment of circuit breaker (100) including GFCI functionality in accordance with certain aspects of the present invention.

Circuit breaker (100) is provided with a housing (102) that contains the working elements of the device. The housing (102) is of a "clamshell" design, with one half of the housing (102) being illustrated in FIGS. 1-3 and with both halves of the housing (102) being illustrated in FIG. 4. The circuit breaker (100) is further provided with a set of contacts including a stationary contact (104) and movable contact (106) (best seen in FIG. 3). The moveable contact (106) is positioned on a moveable contact arm (108).

The moveable contact arm (108) is coupled to a linkage assembly (110), which is in turn, coupled to a handle (114) that includes an elongated portion (112). The moveable contact (106) is configured to move between an open and closed position relative to the stationary contact (104) by manual actuation of the handle (114). FIGS. 1-4 show the contacts (104, 106) in the open position where no electrical current flows therebetween, although one skilled in the art will readily understand how the contacts (104,106) are moved to the closed position.

Also shown in FIG. 1 is a "line" terminal (116), which is adapted to be connected to a source of electrical power (117), such as a bus bar in a panel board or load center. Stationary contact (104) is mounted onto a plate, which in turn is electrically connected to line terminal (116).

Moveable contact (106) mounted on moveable contact arm (108) is electrically connected to an overcurrent current measurement device, which is likewise connected electrically connected to a "load" terminal (118). The line and load terminals (116,118) may take any of numerous forms depending on the type of panel in which the circuit breaker (100) is adapted to be installed, such as comprising stab connections, screw connections, etc.

In operation, electrical power is input into circuit breaker (100) via line terminal (116), which, when the contacts (104,106) are closed, passes through the current measurement device. If the electrical current exceeds a threshold level, the current measurement device will function to "trip" the circuit breaker (100) by opening the circuit—i.e., opening the contacts (104,106) relative to each other by means of a trip mechanism (120)—such that the flow of electrical current through the contacts (104,106) ceases. In the event that the electrical current does not exceed the threshold level set by the current measurement device, the electrical power is allowed to pass through load terminal (118), which in turn, provides electrical power to the connected circuit and/or equipment.

Figure 2:
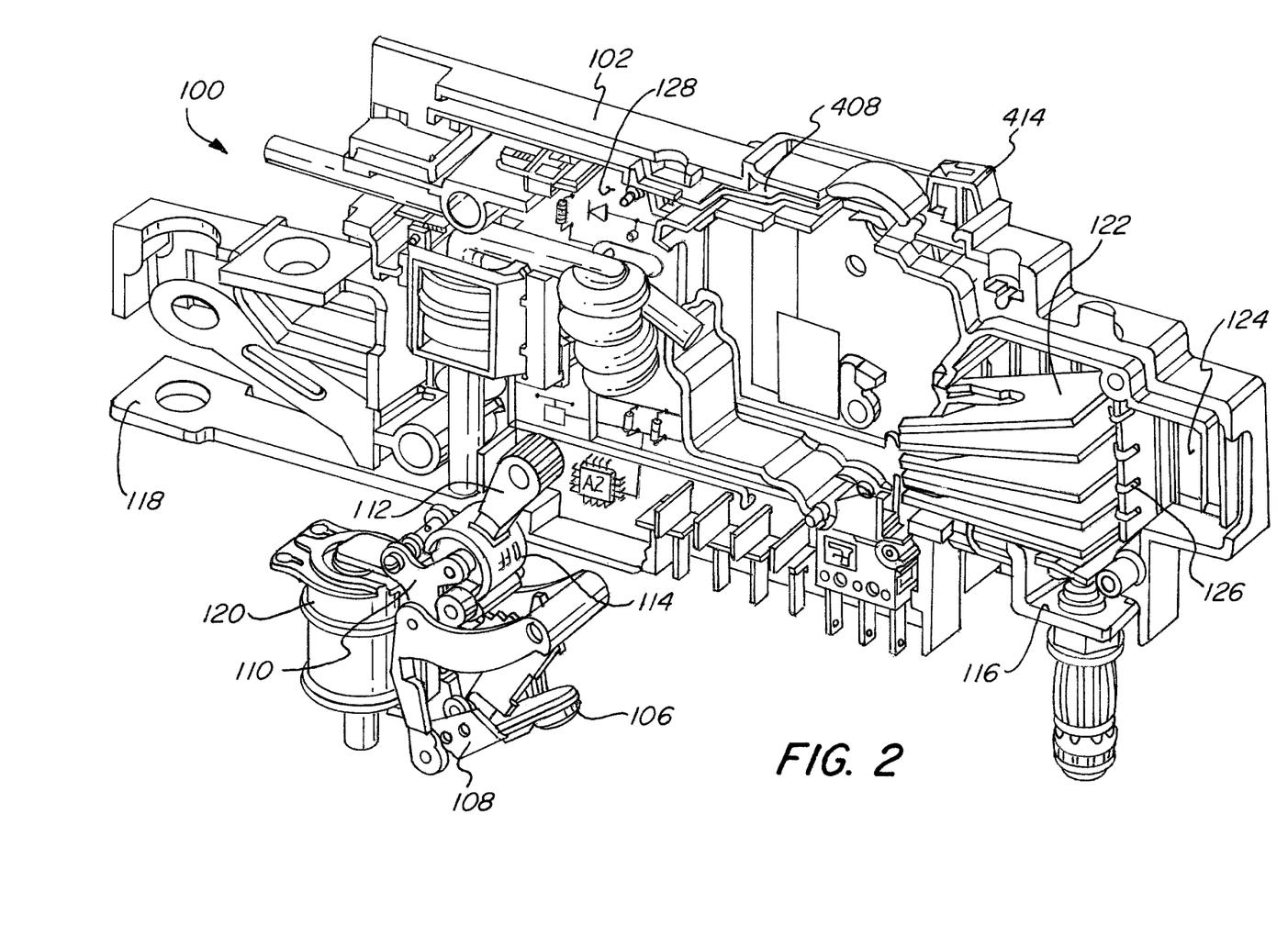
FIG. 2 is a partial exploded isometric view of the circuit breaker of FIG. 1.

As is shown in FIGS. 1 and 2, the moveable contact arm (108), the moveable contact (106), the linkage (110), the handle (114) and the trip mechanism (120) may be formed as a modular circuit breaker mechanism unit prior to being inserted into the housing for ease of manufacture.

Also illustrated in FIG. 1 is an arc quenching device, which may take the form, for example, of arc plates (122), which are provided to assist in drawing an arc formed between the contacts (104,106) as they are opening or closing away from the contacts (104,106) and in quickly quenching said arc. In one configuration, arc plates (122) are positioned in a radial path that corresponds to the path of movement of the moveable contact (106).

Additionally, a vent (124) may be positioned in the housing (102) in the vicinity of the arc plates (122) so as to allow any gases generated by an arc to exit the housing (102). As can be seen, vent (124) may include a number of openings (126), which are positioned based on the positioning of the arc plates (122).

Figure 3:
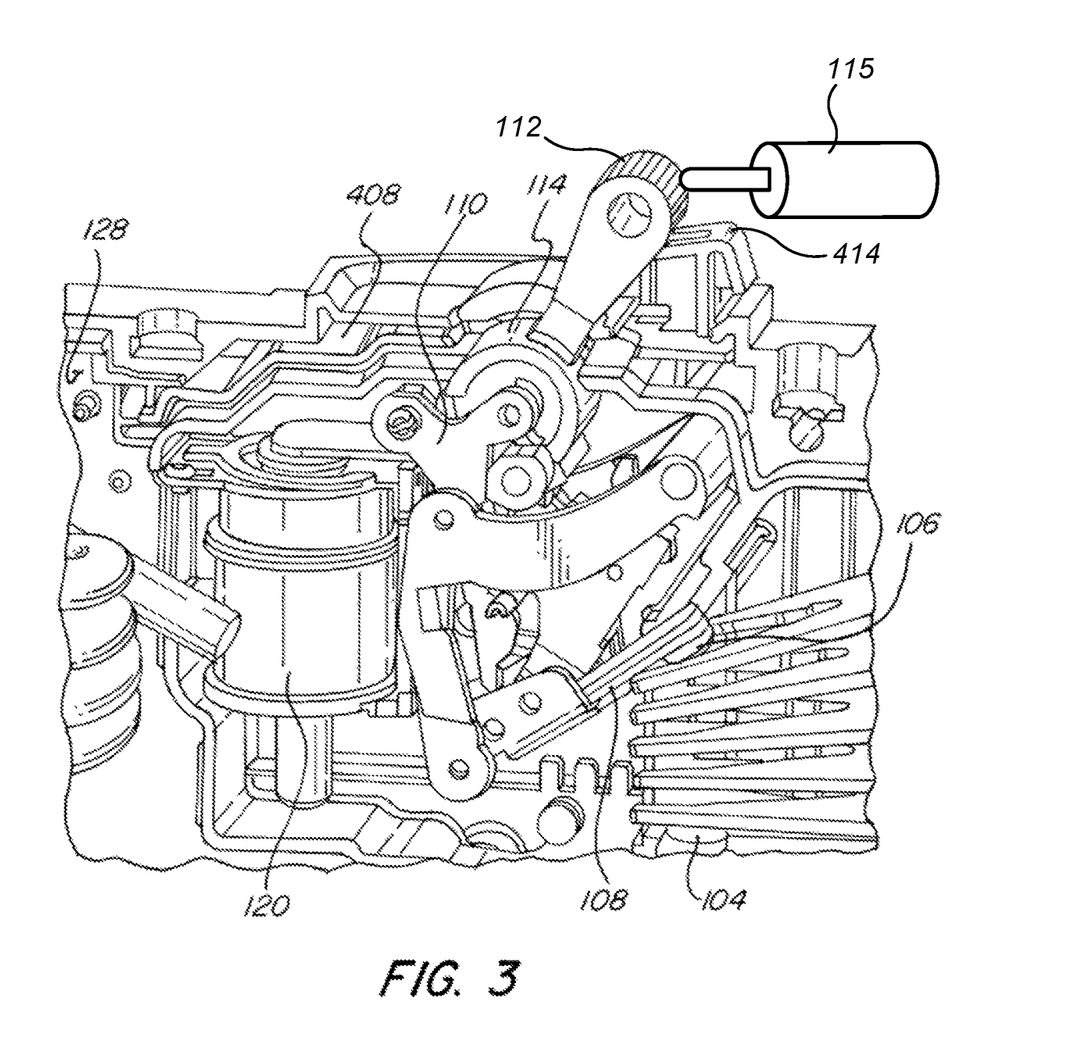
FIG. 3 is a partial isometric view of the testing actuator, resetting handle and surrounding components of the circuit breaker of FIG. 1.

The circuit breaker (100) also includes a printed circuit board (PCB) (128), as best seen in FIGS. 2 and 3. The PCB (128) may incorporate thereon the logic necessary to achieve the GFCI functionality of circuit breaker (100), specifically, causing the circuit breaker (100) to terminate the flow of electricity between the line terminal (116) and the load terminal (118) if a threshold level of leakage is sensed.

Leakage is defined as the amount of current imbalance that is measured as a net result of out-bound and returning current from the load side. This would include, for example, measuring the amount of current outbound to one or more devices plugged into the GFCI protected load circuit, and measuring the amount returning on the neutral connection. If there is leakage such that the amount returning is less than the amount out-bound, this difference is the leakage current. A normally operating circuit will have zero current differential (i.e., leakage) when measuring out-bound compared to return current. However, if a threshold level of leakage is sensed (typically between 4 mA and 6 mA), a ground fault condition will be determined to exist, and the GFCI circuitry will cause current to stop flowing.

More specifically, if a ground fault condition is determined to exist, the fault detector circuitry may activate the trip mechanism (120) to cause the contacts (104,106) to open, thereby tripping the circuit breaker (100). Additionally, in some embodiments, the current measurement device (i.e., the overcurrent detector functionality) may also be incorporated in circuitry on the PCB (128), rather than being embodied as a separate and distinct overcurrent detection device.

As is known in the GFCI art, circuit breaker (100) is provided with a testing feature that simulates a ground fault condition such that the GFCI functionality of circuit breaker (100) causes the circuit breaker (100) to terminate the flow of electricity between the line terminal (116) and the load terminal (118). The circuit breaker (100) may optionally include a "local" testing functionality (e.g., activated by a button, slide or the like disposed on the housing of the breaker itself) allowing testing to be performed by an operator with direct access to the circuit breaker (100). However, as explained more fully below, the circuit breaker (100) additionally, or instead, incorporates a remote testing functionality.

If the local testing functionality is provided, such may take the form of a push button, as has been known for decades on wall outlets. However, rather than employing a typical push button, the illustrated circuit breaker (100) instead includes a slide arrangement for allowing an operator to activate the testing feature, which testing feature arrangement is defined by two main parts.

Figure 4:
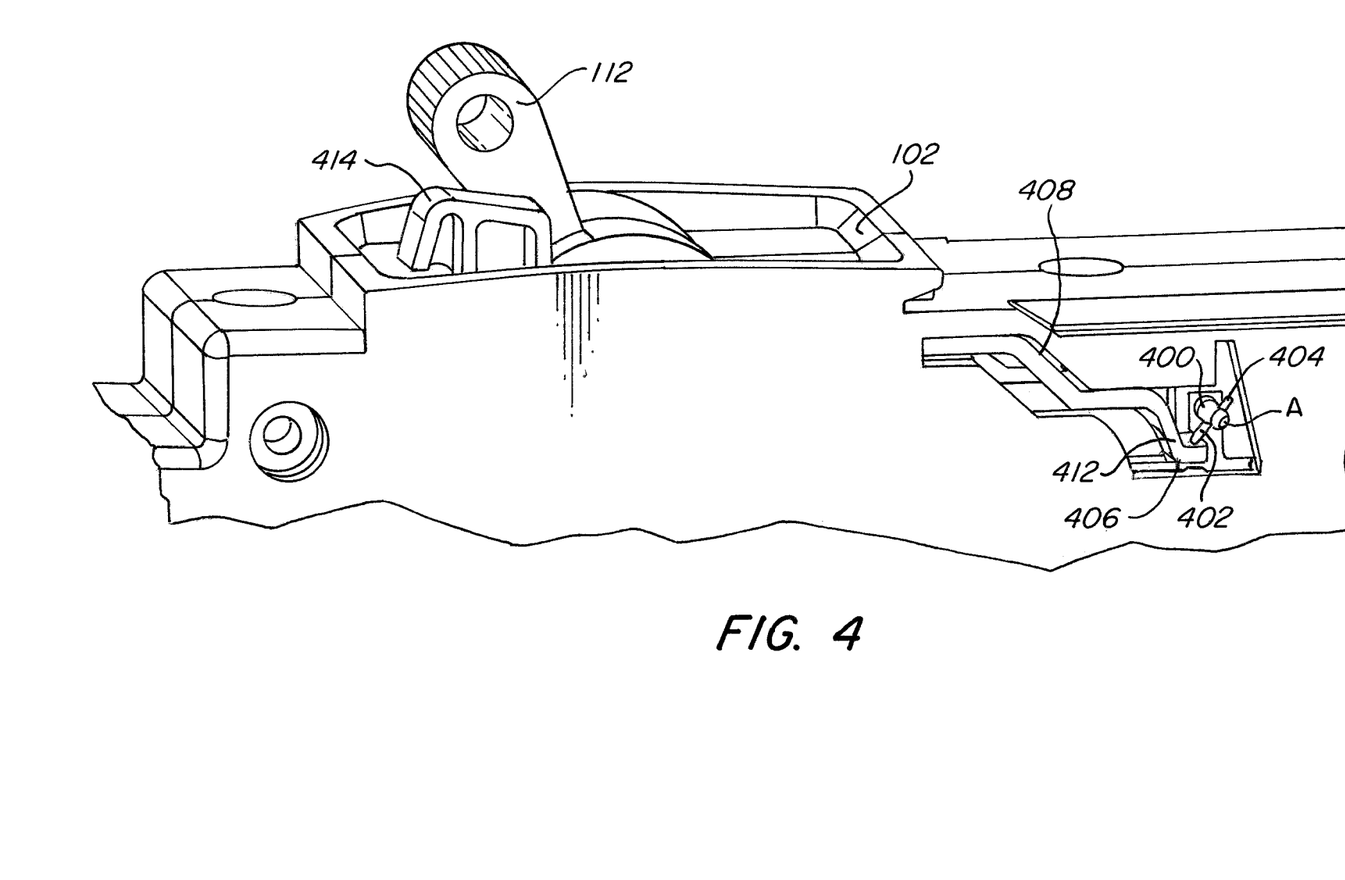
FIG. 4 is an isometric view of an exterior of the assembled circuit breaker of FIG. 1, with portions of the housing cut away to illustrate the configuration of the testing actuator and surrounding components.

As best seen in FIG. 4, the exemplary local testing feature employs a test switch (400) including a pivotable lever arm (402) with a first end (404) pivotably connected to rotate about an axis (A) that is fixed with respect to the housing (102) and a second end (406) that is pivotable in an arc around the axis (A) between an active position (not shown) and an inactive position (shown in FIG. 4). The test device generates the test signal when the second end of the lever arm is actuated from the inactive position (shown in FIG. 4.) to the active position, which is not shown, but which would involve the lever arm (402) being pivoted in a counter clockwise fashion about axis (A).

The testing feature also employs a slide member (408) having a first end (410) that is accessible by an operator through the housing (402) and a second end (412) that cooperates with the second end (406) of the lever arm (402). The slide member (408) is elongated and may be formed from a generally flat piece of material, such as a polymer. As shown in FIGS. 1-4, the slide member (408) may include one or more bends and or cut-outs, for example, to accommodate the shape of the housing (402) and/or to avoid interference with other components of the circuit breaker (100).

The slide member (408) is slideable with respect to the housing (408) and the axis (A) of the lever arm (402) such that the second end (412) of the slide member (408) slides in a plane that is substantially tangential to the arc in which the second end (406) of the lever arm (402) pivots. In the embodiment shown in the Figures, the slide member (408) slides in a plane that is generally parallel to a plane in which lies a majority of the top surface of the housing (102).

The second end (412) of the slide member (408) and the second end (406) of the lever arm (402) cooperate such that generally planar sliding motion of the slide member (408) is translated into pivoting motion of the lever arm (402) about the axis (A).

The slide member (408) is moveable from a standard operation position (shown in FIG. 4) in which the lever arm (402) is in the inactive position to a test position (i.e., toward the right with respect to the orientation shown in FIG. 4) in which the lever arm (402) is caused to pivot to the active position (i.e., counterclockwise with respect to the orientation shown in FIG. 4). Preferably, the second end (406) of the pivotable lever arm (402) is biased, for example, by a spring action, toward the inactive position (i.e., clockwise with respect to the orientation shown in FIG. 4), such that the slide member (408) is also biased toward the standard operation position (i.e., toward the left with respect to the orientation shown in FIG. 4).

The housing (102) has on opening formed therein, and the first end (412) of the slide member (408) has a projection (414) thereon that extends through the opening in the housing (102). The opening is preferably positioned in the top surface of the housing (102), and most preferably in the vicinity of the handle (114), such that the projection (414) of the slide member (408) and the elongated portion (112) of the handle (114) are disposed closely with respect to one another to ensure easy access to both by an operator. This allows for an operator to readily test the GFCI feature of the circuit breaker (100) by actuating the projection (414) of the slide member (408), thereby causing the circuit breaker (100) to trip, and then to reset the circuit breaker (100) by manipulating the elongated portion (112) of the handle (114).

The circuit breaker (100) also incorporates a remote on/off feature whereby an operator may use a remotely located electrical interface, such as a central controller (as described in more detail below) in order to turn off the circuit breaker manually, and/or wherein a controller may cause the circuit breaker to be turned off remotely based on the occurrence of an event unrelated to a sensed ground fault. For example, it may be desired to turn off a circuit breaker powering overhead lights based on time of day, it may be desired to turn off a circuit breaker powering a fan based on a sensed temperature, it may be desirable to turn off a circuit breaker powering a bilge pump based on a sensed water level, etc.

Circuit breakers that are remotely actuatable, whether manually or automatically, are known. Traditionally, such remotely actuatable circuit breakers have involved a solenoid or the like being provided in the circuit breaker, which solenoid acts to trip the circuit breaker in response to an electrical control signal being received from a controller or the like located remotely from the breaker. The illustrated exemplary circuit breaker (100), however, dispenses with the need for such a separate solenoid.

Instead, in accordance with the illustrated exemplary embodiment, when the circuit breaker (100) receives an "off" command signal from a remotely located controller, switch or the like, the circuit breaker (100) generates a ground fault signal at the breaker, such that the GFCI functionality of circuit breaker (100) reacts as if a real ground fault was sensed on the load circuit, and causes the circuit breaker (100) to terminate the flow of electricity between the line terminal (116) and the load terminal (118) (i.e., causes the breaker to trip).

The circuit breaker may be turned back on in the same manner that an otherwise tripped breaker may be reset—that is, by either manual actuation of the handle (114), or by a solenoid or the like type of resetting mechanism (115) responding to a remote "reset" or "on" command in order to actuate the handle (114). Such remotely resettable circuit breakers are disclosed, for example, in commonly owned U.S. Patent Application Publication No. 2015/0101914 and U.S. Pat. No. 9,761,399, the contents of which are incorporated by reference herein in their entirety.

The circuit breaker (100) according to the present invention, in addition to allowing for remote on and off functionality, also allows for remote testing functionality. This remote testing functionality may be provided instead of the local testing functionality (i.e., the testing button or slide on the housing of the circuit breaker may be omitted), or the remote testing functionality may be provided in addition to the local testing functionality.

In any event, the remote testing functionality employs a processor on the PCB (128) that is in communication with a central controller (as described more fully below) or the like via a communication interface (again, described in more detail below).

The communication interface is adapted to receive a remote test command signal, and the processor generates, in response to receipt of the remote test command signal, a simulated fault in the load circuit, such that the fault detector, i.e., trip mechanism (120) attempts to cause actuation of the interrupter, i.e., contacts (104, 106), to the open condition. The processor then determines whether or not the fault detector (120) successfully caused actuation of said interrupter (104, 106) to the open condition in response to receipt of the remote test command signal, and if not, generates an alarm signal indicative of a malfunction. The alarm may be displayed (for example, visually and/or audibly) locally at the breaker, or may be transmitted to a remote location (such as to the central controller), as described more fully below.

Figure 5:
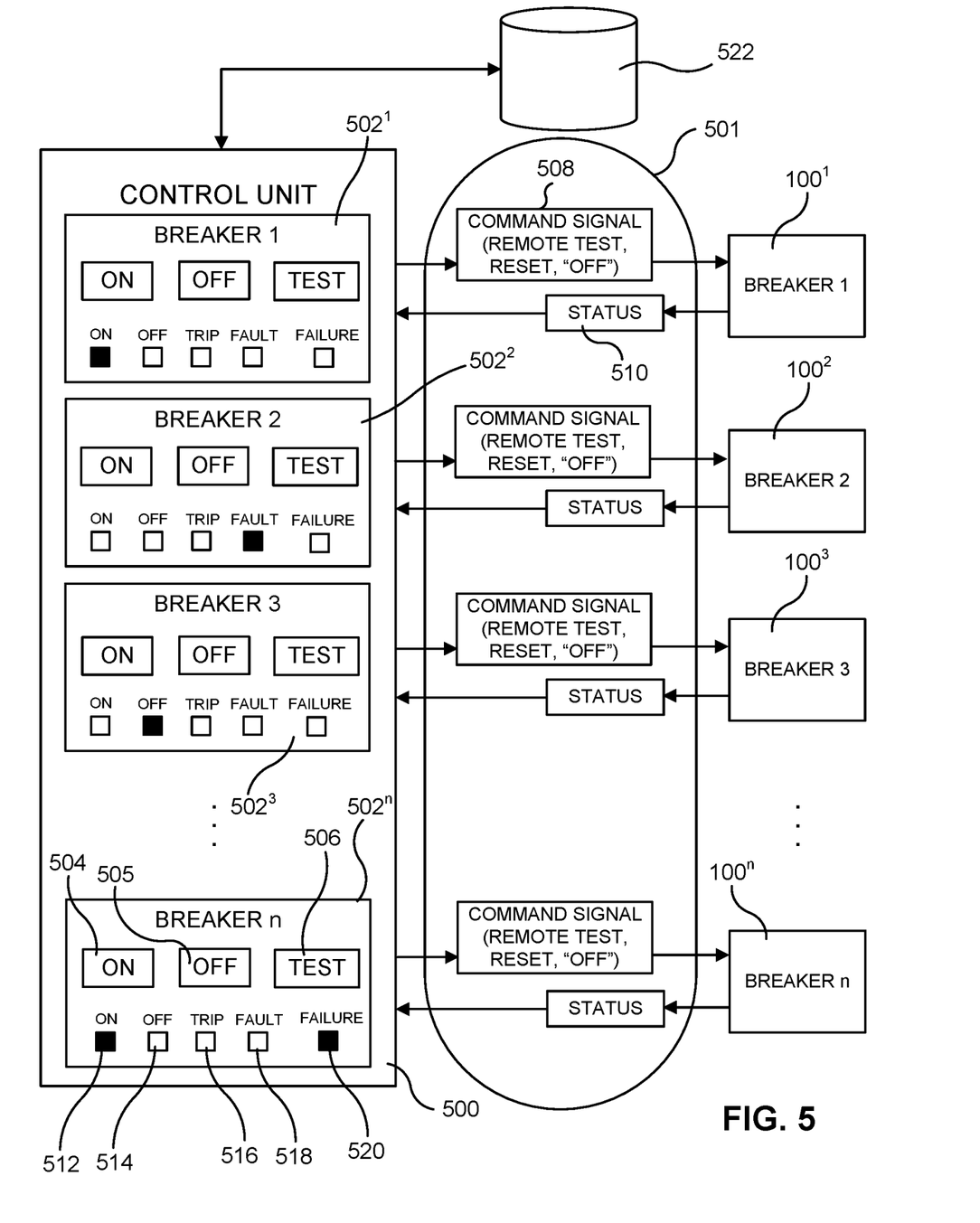
FIG. 5 is a schematic block diagram of a power control and monitoring system incorporating a plurality of circuit breakers according to FIG. 1.

Referring now to FIG. 5, a system is shown including a central control unit (500) communicating electrically via a communication network (501), with a plurality of circuit breakers ($100^1, 100^2, 100^3, 100^n$) configured according to the present invention. The control unit (500) includes a means for inputting commands, as well as a display of the status of each breaker ($100^1, 100^2, 100^3, 100^n$). In a preferred embodiment, the input means and the display are both achieved using a touch panel display having graphical user interface for each circuit breaker ($502^1, 502^2, 502^3, 502^n$). Preferably, the graphical display for each circuit breaker ($502^1, 502^2, 502^3, 502^n$) includes virtual "buttons" or the like allowing for control of each circuit breaker, including at least an "on" button (504), an "off" button (505) and a "test" button (506). If desired, a separate "reset" button (not shown) can be provided, although in the embodiment shown, the reset functionality is combined with the "on" button.

The communication network (501) may be embodied in a wired connection or a wireless connection. For example, a wireless local area network (e.g., WiFi®) and/or a wireless personal area network (i.e., Bluetooth) may be employed. If desired, for example in the case of vehicles, such as a CAN Bus and/or a LIN Bus may be employed.

When any of the various command buttons are triggered, the controller (500) generates and transmits to an appropriate one of the circuit breakers ($100^1, 100^2, 100^3, 100^n$) a command signal (508) indicative of the action triggered by the operator. The command signal (508) may also be automatically generated by the controller (500), based on timed events, various sensed parameters (e.g., temperature, liquid level, etc.) or the like as discussed above, which may be programmed by an operator using the input means and the display. Examples of the command signal (508) may include a remote test command signal, a reset command signal, and/or an "off" command signal, each as discussed in more detail below. An appropriate one of the breakers ($100^1, 100^2, 100^3, 100^n$) executes the command, and if necessary, updates its internal status. Each of the breakers ($100^1, 100^2, 100^3, 100^n$) monitors its internal status and transmits to the controller (500) a status signal (510) indicative of that status, which status is displayed on the graphical user interface for each circuit breaker ($502^1, 502^2, 502^3, 502^n$).

For example, each graphical user interface ($502^1, 502^2, 502^3, 502^n$) may have a graphical indicia of an "on" status (512) indicating that the breaker is on and functioning normally, an "off" status (514) indicating that the breaker has been commanded to be off (either manually or automatically), a "trip" status (516) indicating that the breaker has been tripped because of a sensed overcurrent situation, a "fault" status (518) indicating that the breaker has been tripped because of a sensed ground fault situation, a "failure" status (520) indicative of a failure in in the circuit breaker, for example, because of a failed test of the GFIC functionality (as described above) and possibly various other statuses.

In the example shown in FIG. 5, Breaker 1 ($100^1$) is on, Breaker 2 ($100^2$) has been tripped because of a ground fault, Breaker 3 ($100^3$) is off and Breaker n ($100^n$) is on, but had failed its GFCI functionality test. None of the breakers shown has been tripped due to an overcurrent condition having been sensed.

When a breaker fails a CFCI functionality test it may be desirable to allow the breaker to continue supplying power to the connected load normally (at least for a period of time), such as is shown with Breaker N ($100^n$) in FIG. 5, which is indicated as being "on" in addition to indicating a "failure". This may be desirable, for example, where the load being supplied with power is critical (e.g., in the case of medical equipment, refrigeration equipment, etc.), such that immediately terminating power thereto may be undesirable. However, in some situations, it may be desirable to immediately disable the circuit breaker completely upon a breaker failing the GFIC functionality test, for example, when the circuit is feeding outlets in a bathroom or other wet environment, where there is a relatively high likelihood that failure of the GFCI functionality may potentially lead to serious injury or death in the case of a ground fault. In some situations, power may continue being supplied to the load in order to provide a period of time for the failing circuit breaker to be replaced, before then automatically cutting power to the load and disabling the circuit breaker.

One or more storage devices (522) may be provided, either at the central controller level (500) (as shown in FIG. 5), at the individual circuit breaker level, or at both levels. The storage device (522) may be used to store records of dates and times of when past simulated GFCI tests were performed, so as to track compliance with any rules, regulations and/or suggestions concerning frequency of testing. Additionally, the storage device (522) may be used to store records of when a failure of a GFCI test has occurred, may be used to store records of when a circuit breaker was put into service, and/or may be used to store various other records.

If desired, in addition to the test button (506) being used to initiate the GFCI testing functionality, the remote test command signal may be automatically generated periodically (e.g., at periods dictated by rules, regulations, codes, specifications, recommendations, etc.). Preferably, the period between instances of automatic generation of the remote test command is programmable by a user, for example, to facilitate compliance with local building codes in different geographic areas. The period between instances of test generation may be stored on the storage device (522).

It may be desirable, particularly in instances where the remote test command signal is automatically generated, for the reset command signal to also be generated automatically once it is determined that said fault detector successfully caused actuation of said interrupter to the open condition in response to receipt of the remote test command signal. By doing so, the entire periodic GFCI testing functionality may be automated, such that manual intervention is only required in case of a failed GFCI functionality test, at which time, the failed circuit breaker may be replaced.

Although the above disclosure focusses on ground fault circuit interrupter (GFCI) functionality, it should be recognized that the circuit breaker of the present invention may employ arc fault circuit interrupter (AFCI) functionality, instead of or in addition to GFCI functionality, merely by programming the processors on each circuit breaker (100) and/or the central control unit (500) appropriately.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A circuit interrupting device comprising:
   a housing;
   a line terminal disposed on the housing, said line terminal adapted to be connected to a power source circuit to provide electrical power;

a load terminal disposed on the housing, said load terminal adapted to be connected to a load circuit;

an interrupter disposed within the housing and electrically coupled between said line terminal and said load terminal, said interrupter having an open and a closed condition, wherein said interrupter electrically connects said line terminal to said load terminal in the closed condition and electrically disconnects said line terminal from said load terminal in the open condition;

a fault detector configured to detect a fault in an electrical signal in said load circuit, wherein when a fault is detected on the load circuit, said fault detector causes actuation of said interrupter to the open condition;

a communication interface adapted to receive a remote test command signal; and a processor that generates, in response to receipt of the remote test command signal, a simulated fault in the load circuit, such that said fault detector attempts to cause actuation of said interrupter to the open condition;

wherein said processor determines whether or not said fault detector successfully caused actuation of said interrupter to the open condition in response to receipt of the remote test command signal, and if not, generates an alarm signal indicative of a malfunction; and wherein said processor is adapted to receive a remote off command via the communication interface, and in response to the remote off command, generate a simulated fault in the load circuit, such that said fault detector causes actuation of said interrupter to the open condition, whereby one and the same interrupter is employed for both fault tripping and commanded tripping.

2. The circuit interrupting device of claim 1 further comprising a handle extending from said housing, said handle adapted to allow for said interrupter to be reset from the open condition to the closed condition.

3. The circuit interrupting device of claim 1 further comprising a resetting mechanism, said resetting mechanism adapted to allow for said interrupter to be reset from the open condition to the closed condition upon receipt of a reset command signal.

4. The circuit interrupting device of claim 3 wherein the reset command signal is received via said communication interface.

5. The circuit interrupting device of claim 3 wherein the reset command signal is generated automatically by said processor if said processor determines that said fault detector successfully caused actuation of said interrupter to the open condition in response to receipt of the remote test command signal.

6. The circuit interrupting device of claim 1 wherein the remote test command signal is automatically generated periodically.

7. The circuit interrupting device of claim 6 wherein a period between instances of automatic generation of the remote test command is programmable by a user.

8. The circuit interrupting device of claim 1 further comprising a storage device on which is stored records of dates and times of when past simulated fault tests were performed.

9. The circuit interrupting device of claim 1 wherein the alarm signal is transmitted via the communication interface.

10. The circuit interrupting device of claim 1 wherein the fault comprises at least one of a ground fault and an arc fault.

11. The circuit interrupting device of claim 1 wherein said communication interface comprises a wired connection.

12. The circuit interrupting device of claim 1 wherein said communication.

13. The circuit interrupting device of claim 12 wherein said communication interface comprises at least one of a wireless local area network and aa wireless personal area network. interface comprises a wireless connection.

14. The circuit interrupting device of claim 1 wherein said communication interface comprises a CAN Bus or a LIN Bus.

15. The circuit interrupting device of claim 1:

wherein said circuit interrupting device comprises a circuit breaker;

wherein said interrupter comprises a pair of contacts movable with respect to each other between a closed position wherein the line terminal and the load terminal are in electrical communication with each other, and an open position wherein the line terminal and the load terminal are electrically isolated from each other; and further comprising a trip mechanism connected to at least one of said pair of contacts, said trip mechanism causing said pair of contacts to move from the closed position to the open position in response to an overcurrent, thereby tripping the circuit breaker.

16. A circuit breaker comprising;

a housing;

a line terminal disposed on the housing, said line terminal adapted to be connected to a power source circuit to provide electrical power;

a load terminal disposed on the housing, said load terminal adapted to be connected to a load circuit;

a pair of contacts movable with respect to each other between a closed position wherein the line terminal and the load terminal are in electrical communication with each other, and an open position wherein the line terminal and the load terminal are electrically isolated from each other;

a trip mechanism connected to at least one of said pair of contacts, said trip mechanism causing said pair of contacts to move from the closed position to the open position in response to an overcurrent, thereby tripping the circuit breaker;

a fault detector configured to detect a fault in an electrical signal in said load circuit, wherein when a fault is detected on the load circuit, said fault detector causes actuation of said pair of contacts to the open condition;

a communication interface adapted to receive a remote test command signal that is automatically generated periodically;

a processor that generates, in response to receipt of the remote test command signal, a simulated fault in the load circuit, such that said fault detector attempts to cause actuation of said pair of contacts to the open condition;

wherein said processor determines whether or not said fault detector successfully caused actuation of said pair of contacts to the open condition in response to receipt of the remote test command signal, and if not, generates an alarm signal indicative of a malfunction;

wherein said processor is adapted to receive a remote off command via the communication interface, and in response to the remote off command, generate a simulated fault in the load circuit, such that said fault detector causes actuation of said pair of contacts to the open condition, whereby one and the same pair of contacts is employed for both fault tripping and commanded tripping and a resetting mechanism, said resetting mechanism adapted to allow for said pair of contacts to be reset from the open condition to the closed condition upon receipt of a reset command signal via said communication interface, wherein the reset command signal is generated automatically by said processor if said processor determines that said fault detector successfully caused actuation of said pair of contacts to the open condition in response to receipt of the remote test command signal.

17. The circuit breaker of claim 16 wherein a period between instances of automatic generation of the remote test command is programmable by a user.

18. The circuit breaker of claim 16 further comprising a storage device on which is stored records of dates and times of when past simulated fault tests were performed.

19. The circuit breaker of claim 16 wherein the alarm signal is transmitted via the communication interface.

20. The circuit breaker of claim 16 further comprising a handle extending from said housing, said handle adapted to allow for said pair of contacts to be reset from the open condition to the closed condition.

21. The circuit breaker of claim 16 wherein the fault comprises at least one of a ground fault and an arc fault.

22. The circuit breaker of claim 16 wherein said communication interface comprises a wired connection.

23. The circuit breaker of claim 16 wherein said communication interface comprises a wireless connection.

24. The circuit breaker of claim 23 wherein said communication interface comprises at least one of a wireless local area network and a wireless personal area network.

25. The circuit breaker of claim 16 wherein said communication interface comprises a CAN Bus or a LIN Bus.

\* \* \* \* \*